US007497794B2

(12) United States Patent
Lannutti et al.

(10) Patent No.: US 7,497,794 B2
(45) Date of Patent: Mar. 3, 2009

(54) BELT TENSIONER AND METHOD FOR ASSEMBLY

(75) Inventors: Anthony E. Lannutti, Republic, MO (US); Steve E. Scott, Springfield, MO (US); Robert C. Joslyn, Christian County, MO (US); Robert J. Crist, Greene County, MO (US); Terrence R. Quick, Greene County, MO (US); Douglas G. Gerring, Hartland, MI (US); Randall R. Diefenderfer, Greene County, MO (US); Stephen G. Webb, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 427 days.

(21) Appl. No.: 11/302,335

(22) Filed: Dec. 13, 2005

(65) Prior Publication Data

US 2006/0100049 A1    May 11, 2006

Related U.S. Application Data

(63) Continuation-in-part of application No. 10/982,718, filed on Nov. 5, 2004, now Pat. No. 7,448,974.

(51) Int. Cl.
*F16H 7/12* (2006.01)
(52) U.S. Cl. .................................. 474/135; 474/133
(58) Field of Classification Search .............. 474/133, 474/135
See application file for complete search history.

(56) References Cited

U.S. PATENT DOCUMENTS

| 4,596,538 | A |   | 6/1986  | Henderson |
| 4,698,049 | A |   | 10/1987 | Bytzek et al. |
| 4,971,589 | A | * | 11/1990 | Sidwell et al. ............... 474/135 |
| 5,057,059 | A |   | 10/1991 | Sidwell et al. |
| 5,149,306 | A |   | 9/1992  | Sidwell et al. |
| 5,250,009 | A |   | 10/1993 | Sidwell et al. |
| 5,478,285 | A | * | 12/1995 | Bakker et al. ................ 474/135 |
| 5,620,385 | A |   | 4/1997  | Cascionale et al. |
| 5,772,549 | A |   | 6/1998  | Berndt et al. |
| 5,795,257 | A |   | 8/1998  | Giese et al. |
| 6,004,235 | A |   | 12/1999 | Ohta et al. |
| 6,217,470 | B1 |  | 4/2001  | Quintus |

* cited by examiner

*Primary Examiner*—Richard W L Ridley
*Assistant Examiner*—Terence Boes
(74) *Attorney, Agent, or Firm*—Joseph V. Tassone; Thompson Hine LLP (57) ABSTRACT

A first belt tensioner includes an arm, spring case, coil spring, and arm plate. The arm is adapted to support an idler pulley and has a hook portion. The spring case is disposed in the arm and has a first spring seat. The spring is disposed in the spring case. The arm plate has a second spring seat. The spring is longitudinally compressed between the arm plate and the spring case. The spring is in torsion with the end portions of the spring seated against a corresponding spring seat and with the arm plate rotationally positioned under the hook portion. A method for assembling the first belt tensioner includes using the arm plate to longitudinally compress the spring and rotating the arm plate. A second belt tensioner includes an arm, spring case, coil spring, arm plate, and pivot bushing.

20 Claims, 7 Drawing Sheets

BELT TENSIONER AND METHOD FOR ASSEMBLY

CROSS-REFERENCE TO RELATED APPLICATIONS

The present application is a continuation-in-part application of U.S. patent application Ser. No. 10/982,718 filed Nov. 5, 2004 now U.S. Pat. No. 7,448,974.

TECHNICAL FIELD

The present invention relates generally to tensioning devices, and more particularly to a belt tensioner and to a method for assembling a belt tensioner.

BACKGROUND OF THE INVENTION

The automotive industry utilizes belt tensioners to create a generally constant tension on a belt as it changes in length from normal wear, or from changes in span lengths due to span speed differences, wherein the belt is driven by a single drive pulley from the output shaft of the engine and wherein the belt rotates driven pulleys, each operating an automotive accessory. In known designs, the belt tensioner includes either a flat-wound spring or a helical spring, a spring casing, and an arm. One end of the spring is attached to the spring casing and the other end of the spring is attached to the arm. The arm pivots with respect to the spring casing when the spring exerts torque. The spring casing is attached to the engine, and an idler pulley is attached to the arm. The spring is preloaded by twisting the arm relative to the spring casing. The idler pulley on the arm is then placed against the belt. As the belt span lengthens, the torque from the preloaded spring continues to cause the idler pulley of the arm to apply pressure against the belt keeping the belt in tension.

In one known arrangement patented as U.S. Pat. No. 5,772,549, a helical spring has a first end screwed into a first screw-like passage of the arm of the spring tensioner and has a second end screwed into a second screw-like passage of the spring casing. The spring is under tension and holds the parts together while permitting the arm to rotate relative to the spring casing. A cone-shaped bushing is disposed inside the spring between a portion of the arm and a portion of the spring casing to facilitate the rotation of the arm relative to the spring casing. This arrangement is open to contamination and the spring configuration creates a moment loading.

In one known example of a belt tensioner, a square-shaped hole in the idler pulley is engaged by a square head, often as would be common to a ½" or ⅜" leveraging or ratchet or similar wrench, to lift (preload) the arm. In a different known example, the idler pulley is mounted on a post of the arm, wherein the post has an annular rim which is deformed radially outward and over the bearing of the idler pulley creating a radial rivet joint to retain the idler pulley to the arm In one known method, the arm is cast using a mold having first and second sections, and the spring case is cast using a mold having first and second segments. In this method, a path in the belt tensioner from the arm's seat for the bearing of the idler pulley to the engine mounting surface of the spring case crosses a line on the spring case corresponding to the parting line of the first and second segments.

Still, engineers continue to seek improved belt tensioners.

SUMMARY OF THE INVENTION

A first expression of an embodiment of the invention is for a belt tensioner which includes a belt-tensioner arm, a belt-tensioner spring case, a belt-tensioner coil spring, and an arm plate. The arm is adapted to support an idler pulley and has a hook portion. The spring case is positioned in the arm and has a first spring seat. The spring is positioned in the spring case and has a longitudinal axis and longitudinally spaced apart first and second end portions. The arm plate is rotatable about the longitudinal axis and has a second spring seat. The spring is longitudinally compressed between the arm plate and the spring case. The spring is in torsion, wherein the first end portion is rotationally seated against the first spring seat of the spring case, wherein the second end portion is rotationally seated against the second spring seat of the arm plate, and wherein the arm plate is rotationally disposed under the hook portion of the arm, thus securing the belt tensioner at least by compressive longitudinal spring force.

A method of the invention is for assembling the belt tensioner described in the previous paragraph and includes several steps. One step includes placing the spring case in the arm. Another step includes placing the spring in the spring case. Another step includes using the arm plate to longitudinally compress the spring and rotating the arm plate until the spring is in torsion with the first end engaging the first spring seat, with the second end engaging the second spring seat, and with the arm plate longitudinally passing inward of the hook portion. Another step includes rotating the arm plate to release some of the torsion in the spring for the second end to rotationally urge the arm plate under the hook portion. Another step includes using the arm plate to release some of the longitudinal compression in the spring until the arm plate becomes trapped underneath the hook portion.

A second expression of an embodiment of the invention is for a belt tensioner which includes a belt-tensioner arm, a belt-tensioner spring case, a belt-tensioner coil spring, an arm plate, and a pivot bushing. The arm is adapted to support an idler pulley. The spring case is positioned in the arm. The spring is positioned in the spring case. The spring is longitudinally compressed between the arm plate and the spring case. The pivot bushing circumferentially surrounds the spring, has a substantially outward or inward flared cone portion, and has a substantially constant diameter cylinder portion.

Several benefits and advantages are derived from one or more of the expressions of an embodiment and method of the invention. In one example, having a longitudinally compressed spring in torsion, a hook portion of the arm, a first spring seat of the spring case, and a second spring seat of an arm plate allows assembly and disassembly of a belt tensioner without the use of assembly fasteners. In the same or a different example, having a pivot bushing with a substantially outward or inward flared cone portion and a substantially constant diameter cylinder portion delivers improved offset and damping control (via the cone portion) and alignment guidance (via the cylinder portion), as can be appreciated by those skilled in the art.

DETAILED DESCRIPTION

Figure 1:
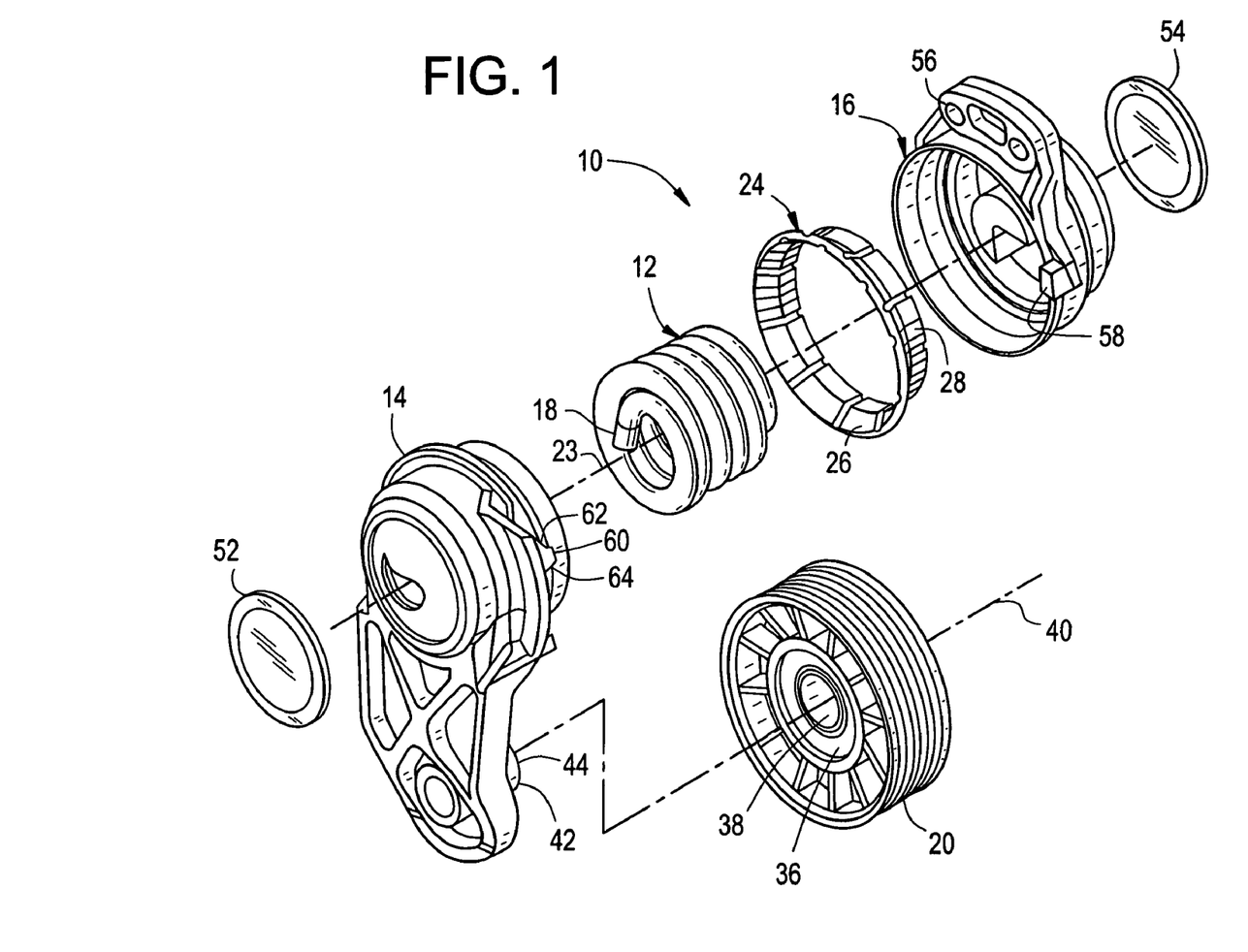
FIG. 1 is an exploded view of an embodiment of the belt tensioner of the invention including an idler pulley.
Figure 2:
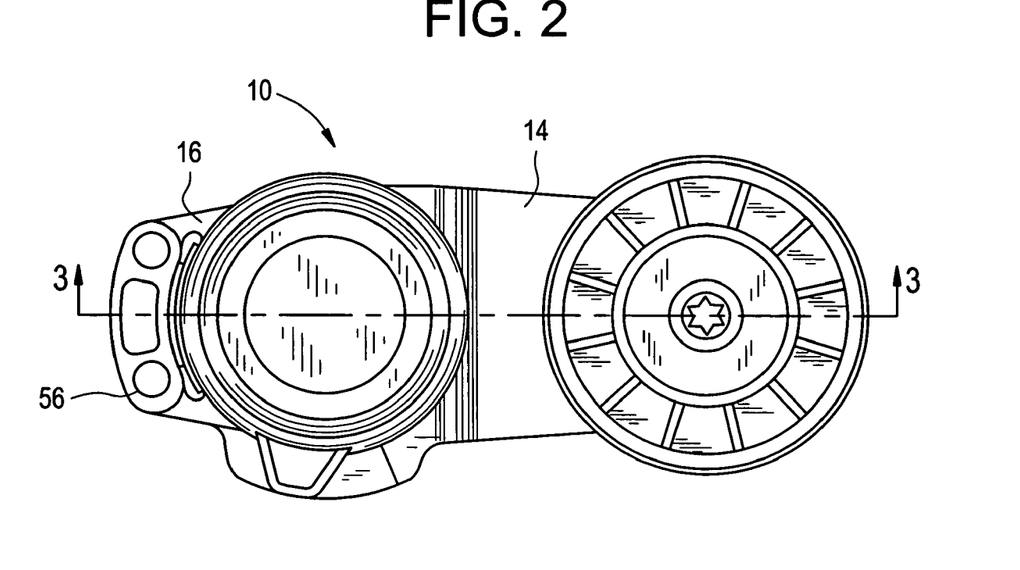
FIG. 2 is a planar view of the assembled belt tensioner of FIG. 1 in a direction looking down on the idler pulley.
Figure 3:
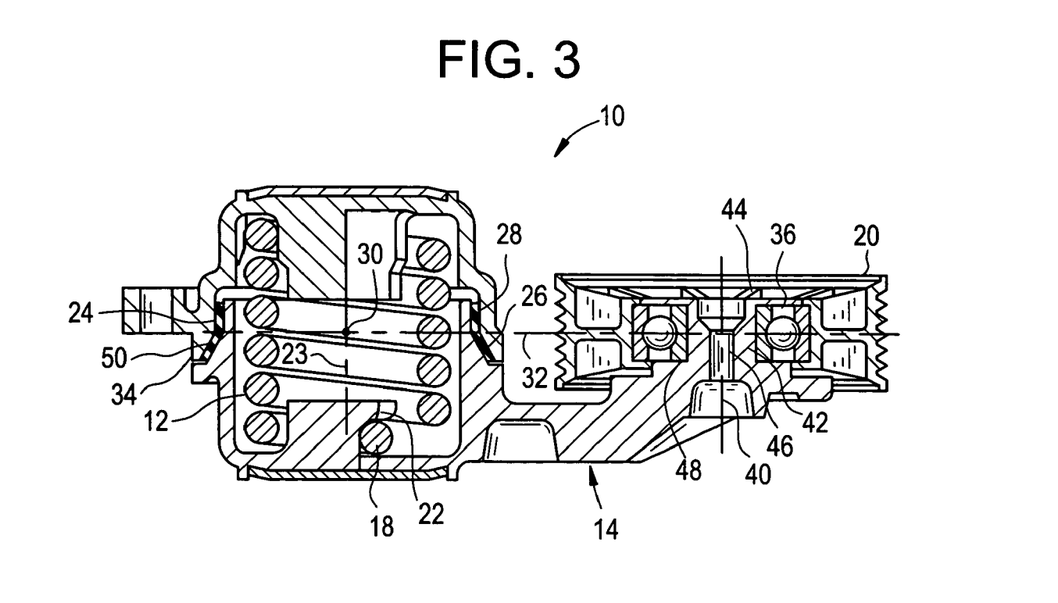
FIG. 3 is a cross-sectional view of the assembled belt tensioner of FIG. 2 taken along lines 3-3 of FIG. 2.

Referring now to the drawings, FIGS. 1-3 illustrate an embodiment of the present invention. A first expression of the embodiment shown in FIGS. 1-3 is for a belt tensioner 10 including a belt-tensioner helical spring 12, a belt-tensioner arm 14, and a belt-tensioner spring case 16. The belt-tensioner helical spring 12 has inwardly projecting first and second end portions. Only the first end portion 18 of the helical spring 12 is shown in the figures with the understanding that, in one example, the second end portion is substantially identical to the first end portion 18. The belt-tensioner arm 14 is adapted to support an idler pulley 20 and has a first hook portion 22. The first end portion 18 of the helical spring 12 is retained by the first hook portion 22 of the arm 14. The belt-tensioner spring case 16 has a second hook portion. Only the first hook portion 22 of the arm 14 is shown in the figures with the understanding that, in one example, the second hook portion of the spring case 16 functions substantially identically to the first hook portion 22 of the arm 14. The second end portion of the helical spring 12 is retained by the second hook portion of the spring case 16, thus securing the belt tensioner 10 at least by (and in one example solely by) compressive longitudinal spring force. It is noted that the inward spring tang (i.e. end portion) orientation automatically creates a zero-moment spring force as can be appreciated by the artisan.

In one implementation of the first expression of the embodiment of FIGS. 1-3, the first 18 and second end portions of the helical spring 12 each project substantially radially inward. In one variation, the helical spring 12 is coiled about a longitudinal axis 23 defining an inner spring diameter and the tip of the first end portion 18 of the helical spring 12 is disposed closer to the longitudinal axis 23 than to the inner diameter of the helical spring 12.

In one example of the embodiment of FIGS. 1-3, the helical spring 12 is in tension. It is noted that a controlled axial stretch of the helical spring 12 sustains force on, in one example, an alignment-controlling pivot bushing (to be described later) with the spring tension applying a continued force to the pivot bushing, for sustained damping and alignment control, even as the pivot bushing wears thinner throughout the duty cycle. In one application of the first expression of the embodiment of FIGS. 1-3, the helical spring 12 is rotationally pulled upon windup. This will cause the helical spring 12 to shorten upon windup and thus decrease the contact pressure and wear on, in one example, the pivot bushing. In one variation this is optimized for improved product function. In a different application (and mirrored coil and hook construction) of the first expression of the embodiment of FIGS. 1-3, the helical spring 12 is rotationally pushed upon windup. This will cause increased axial force to be placed upon, in one example, the pivot bushing enabling a level of positionally-asymmetric damping as can be appreciated by the artisan. In one variation of either or both applications, the helical spring 12 is a round-wire spring.

In one enablement of the first expression of the embodiment of FIGS. 1-3, the belt tensioner 10 also includes a pivot bushing 24 disposed between, and in contact with, the arm 14 and the spring case 16 and circumferentially surrounding the helical spring 12. In one variation, the helical spring 12 is in tension, the spring case 16 includes a protrusion 58 having a blocking surface, the arm 14 includes a locking portion 60 having a blocking surface 64, at least one of the locking portion 60 and the protrusion 58 has a leading inclined surface (or ramp) 62, and wherein self unwinding of the helical spring 12 and disassembly of the belt tensioner 10 is prevented by engagement of the blocking surface of the protrusion 58 with the blocking surface 64 of the locking portion 60. This variation enables a single motion, self-locking method of assembly of the belt tensioner 10 as can be appreciated by those skilled in the art. In one example, the substantially consistent spring positioning from the self-locking method eliminates play of the spring and its effect on torque variation.

In one modification, the pivot bushing 24 includes a substantially outward or inward flared cone portion 26 and a substantially constant diameter cylinder portion 28. In one configuration, the cone portion 26 is disposed closer to the first end portion 18 of the helical spring 12 than is the cylinder portion 28. In another configuration, not shown, the cone portion is disposed closer to the second end portion of the spring than is the cylinder portion. In one application, the cone portion 26 and the cylinder portion 28 are disposed radially between, and in contact with, the arm 14 and the spring case 16, the construction of which permits one to optimize for wear vs. load. The horizontal portion of cone 26 serves to minimize offset change with increased area, and the vertical portion of cone 26 works in conjunction with the cylinder portion 28 serving for alignment guidance as can be appreciated by those skilled in the art.

In one illustration, the belt tensioner 10 also includes an idler pulley 20 supported by the arm 14, wherein the pivot bushing 24 has a centroid (indicated by a dot 30), wherein the idler pulley 20 has a plane of belt loading (indicated by a dashed line 32), and wherein the centroid 30 is disposed proximate the plane of belt loading 32. In one construction, the centroid 30 lies substantially in the plane of belt loading 32. Having the bushing centroid essentially in the plane of belt loading minimizes moment loading.

In one arrangement, the spring case 16 has a case rim 34, and the cone portion 26 of the pivot bushing 24 is disposed proximate the case rim 34. Having the pivot bushing 24 be located in a most radially outward position takes full advantage of available annular wear surface.

One procedure for assembling the belt tensioner 10 of the first expression of the embodiment of FIGS. 1-3, wherein the helical spring 12 is rotationally pulled upon windup and the second hook portion of the spring case 16 is ramped, includes steps a) through c). Step a) includes disposing the first end portion 18 of the helical spring 12 in contact with the arm 14. Step b) includes disposing the second end portion of the helical spring 12 in contact with the spring case 16. Step c) includes relatively twisting the arm 14 and the spring case 16 trapping the first end portion 18 under the first hook portion 22 of the arm 14 and the second end portion under the second hook portion of the spring case 16 and pulling the helical spring 12 in tension. In one variation, counter rotation is prevented by a protrusion 58 on the spring case 16 and a locking portion 60 on the arm 14, the locking portion 60 having a leading inclined surface 62 and a blocking surface 64, wherein the protrusion 58 rides up and over the inclined surface 62 and down the blocking surface 64 of the locking portion 60 during step c), wherein counter rotation is prevented by counter rotational engagement of the protrusion 58 with the blocking surface 64 of the locking portion 60, and wherein disassembly is accomplished by pulling the spring case 16 and the arm 14 apart a distance to allow the protrusion 58 to clear the blocking surface 64 of the locking portion 60 whereupon counter rotation is enabled. In this variation, there is a self-locking together of the arm 14 and the spring case 16. Self-locking tangs on the arm and spring case make for rapid, robust assembly. Other such variations providing self-locking (including having the protrusion on the arm and/or having the protrusion be inclined) are left to the artisan. In a different variation, fasteners are used to secure together the arm 14 and the spring case 16 after the first 18 and second end portions are longitudinally trapped to prevent counter rotation and disassembly.

A second expression of the embodiment shown in FIGS. 1-3 is for a belt tensioner 10 including a belt-tensioner spring (e.g., helical spring 12), a belt-tensioner arm 14, a belt-tensioner spring case 16, and a pivot bushing 24. The belt-tensioner spring (e.g., helical spring 12) has first 18 and second end portions. The belt-tensioner arm 14 is in contact with the first end portion 18 of the spring (e.g., helical spring 12) and is adapted to support an idler pulley 20. The belt-tensioner spring case 16 is in contact with the second end portion of the spring (e.g., helical spring 12). The pivot bushing 24 circumferentially surrounds the spring (e.g., helical spring 12), has an outwardly-flared cone portion 26, and has a substantially constant diameter cylinder portion 28.

In one example of the second expression of the embodiment of FIGS. 1-3, the cone portion 26 is disposed closer to the first end portion 18 of the spring (e.g., helical spring 12) than is the cylinder portion 28. In another example, not shown, the cone portion is disposed closer to the second end portion of the spring than is the cylinder portion. In one construction, the spring is a helical spring 12. In another construction, not shown, the spring is a flat-wound spring. In one arrangement of the second expression of the embodiment of FIGS. 1-3, the cone portion 26 is flared outwardly. In another arrangement, not shown, the cone portion is flared inwardly.

In one implementation of the second expression of the embodiment of FIGS. 1-3, the cone portion 26 and the cylinder portion 28 are disposed radially between, and in contact with, the arm 14 and the spring case 16. In one variation, the belt tensioner 10 also includes an idler pulley 20 supported by the arm 14, wherein the pivot bushing 24 has a centroid 30, wherein the idler pulley 20 has a plane of belt loading 32, and wherein the centroid 30 is disposed proximate the plane of belt loading 32. In one modification, the centroid 30 lies substantially in the plane of belt loading 32 to decrease moment loading.

In one configuration of the second expression of the embodiment of FIGS. 1-3, the spring case 16 has a case rim 34, and the cone portion 26 is disposed proximate the case rim 34. In one deployment of the second expression of the embodiment of FIGS. 1-3, the belt tensioner 10 is substantially devoid of any gap between the spring case 16 and the pivot bushing 24 and between the arm 14 and the pivot bushing 24. This location of the pivot bushing 24 enables the pivot bushing 24 to act as a sealing device mitigating contaminant entry into the belt tensioner 10 as can be appreciated by those skilled in the art.

The previously described examples, procedures, etc. of the first expression of the embodiment of FIGS. 1-3 are equally applicable to the second expression of the embodiment of FIGS. 1-3.

A third expression of the embodiment of FIGS. 1-3 is for a belt tensioner 10 including an idler pulley 20 and a belt-tensioner arm 14. The idler pulley 20 has a bearing 36 including a mounting hole 38 having a longitudinal axis 40. The belt-tensioner arm 14 includes a post 42. The post 42 is disposed in the mounting hole 38 of the bearing 36 of the idler pulley 20 and extends longitudinally beyond the bearing 36. The post 42 has an annular rim 44 deformed radially outward and over the bearing 36 of the idler pulley 20 creating a radial rivet joint. The post 42 has a non-circular hole portion 46 disposed longitudinally below the annular rim 44 and adapted for engagement by a belt-tensioner arm-lifting tool (not shown). In one arrangement, the non-circular hole portion 46 is a star-shaped orifice (such as identified in ISO standard 10664 for hexalobular internal driving features), and the non-circular head is a star-shaped head (such as a TORX® head). In other arrangements not shown, the non-circular hole portion has a multi-lobed shape, a hex-shape, or a slot shape. In one implementation, the belt-tensioner arm-lifting tool is wrench such as a ratchet or similar wrench The annular rim 44 of the post 42 allows assembly of the idler pulley 20 to the post by a radial rivet joint (by simply deforming the annular rim 44 over the bearing 36 of the idler pulley 20) avoiding use of a bolt. The non-circular hole portion 46 (e.g., star-shaped orifice) of the post 42 below the annular rim 44 allows lifting (i.e., rotating) the arm 14 of an assembled belt tensioner 10 (when, for example, the spring case 16 is mounted to an automotive engine) with, for example, a ratchet or similar wrench equipped with a TORX® or hex head. Thus, the post 42 saves space in providing both the lift-lug geometry to lift the arm 14 and a radial rivet joint to secure the bearing 36 of the idler pulley 20.

The previously described examples, procedures, etc. of the first and/or second expressions of the embodiment of FIGS. 1-3 are equally applicable to the third expression of the embodiment of FIGS. 1-3.

A method of the invention is for manufacturing an arm 14 and a spring case 16 of a belt tensioner 10. The arm 14 has a bearing seat 48 adapted to support a bearing 36 of an idler pulley 20 and has an arm-to-bushing mounting surface 50 adapted to support a pivot-bushing 24. The spring case 16 includes an ear (the protruding portion of the spring case 16 having the mounting holes 56) having a belt-tensioner mounting surface (the longitudinally facing surface of the ear seen in FIG. 1). The method includes several steps. One step includes obtaining a belt-tensioner-arm casting mold (not shown) including a first section and a second section, wherein the first section has a first surface portion for casting the bearing seat 48 and a second surface portion for casting the arm-to-bushing mounting surface 50. Another step includes disposing the first and second sections together along a parting line. Another step includes casting the arm 14 using the disposed first and second sections. Another step includes obtaining a belt-tensioner-spring-case casting mold (not shown) including a first segment and a second segment, wherein the first segment includes a surface portion for casting the belt-tensioner mounting surface of the ear. Another step includes disposing the first and second sections together along a parting line. Another step includes casting the spring case 16 using the disposed first and second segments, wherein a path in the belt tensioner 10 from the bearing seat 48 to the belt-tensioner mounting surface does not cross a line on the arm 14 corresponding to the parting line of the first and second sections and does not cross a line on the spring case 16 corresponding to the parting line of the first and second segments.

In one implementation of the method, the arm-casting step uses only the disposed first and second sections (i.e., there are no other mold sections). In the same or a different implementation, the spring-case-casting step uses only the disposed first and second segments (i.e., there are no other mold segments). In the same or a different implementation, the belt-tensioner mounting surface is disposable in contact with an engine.

It is noted that having a path in the belt tensioner from the bearing seat 48 to the belt-tensioner mounting surface which does not cross a line on the arm 14 corresponding to the parting line of the first and second sections and which does not cross a line on the spring case 16 corresponding to the parting line of the first and second segments minimizes the casting effect on offset and alignment.

In one variation, whether or not a parting line is crossed, having the belt-tensioner mounting surface of the ear of the spring case 16 be on the same segment of the belt-tensioner-spring-case casting mold as the surface of the spring case 16 that touches the pivot bushing 24 reduces the bending moment placed upon the pivot bushing 24 alleviating pinch-related wear and puts all in line with the hub load which minimizes stack-up of the arm/puller assembly offset.

In one design of any one or more or all of the expressions of the embodiment of FIGS. 1-3, the arm 10 includes a first end cap 52, and the spring case 16 includes a second end cap 54 and includes mounting holes 56 for mounting to, in one example, an automotive or heavy duty combustion engine. Non-automotive applications of the belt tensioner 10 are left to the artisan Several benefits and advantages are derived from one or more of the expressions of an embodiment and method of FIGS. 1-3. Having inwardly projecting first and second end portions of a belt-tensioner helical spring avoids out-of-plane loads or couples from assembly forces. A pivot bushing with a substantially outward or inward flared cone portion and a substantially constant diameter cylinder portion delivers improved offset control (via the cone portion) and alignment guidance (via the cylinder portion). Having a belt-tensioner arm including a post having an annular rim and having a non-circular hole portion below the annular rim enables a radial rivet joint to secure an idler pulley to the post and enables access to the non-circular hole portion of the post by a belt-tensioner arm-lifting tool to lift the arm for placing it against a belt creating tension in the belt. In one example, having the pivot bushing centroid essentially in the plane of belt loading minimizes moment loading upon the bushing itself. In the same or a different example, locking hooks on the arm and spring case make for rapid, robust assembly with solid engagement that minimizes residual torque creep from tang movement. Having a path in the belt tensioner from the bearing seat to the belt-tensioner mounting surface which does not cross a line on the arm corresponding to the parting line of the first and second sections and which does not cross a line on the spring case corresponding to the parting line of the first and second segments minimizes the casting effect on offset and alignment as can be appreciated by those skilled in the art.

Referring again to the drawings, FIGS. 4-9 illustrate a second embodiment of the present invention. A first expression of the embodiment shown in FIGS. 4-9 is for a belt tensioner 110 which includes a belt-tensioner arm 112, a belt-tensioner spring case 114, a belt-tensioner coil spring 116, and an arm plate 118. The arm 112 is adapted to support an idler pulley 120 and has a hook portion 122. The spring case 114 is disposed in the arm 112 and has a first spring seat 124. The spring 116 is disposed in the spring case 114 and has a longitudinal axis 126 and longitudinally spaced apart first and second end portions 128 and 130. The arm plate 118 is rotatable about the longitudinal axis 126 and has a second spring seat 132. The spring 116 is longitudinally compressed between the arm plate 118 and the spring case 114. The spring 116 is in torsion wherein the first end portion 128 is rotationally seated against the first spring seat 124 of the spring case 114, wherein the second end portion 130 is rotationally seated against the second spring seat 132 of the arm plate 118, and wherein the arm plate 118 (meaning at least a portion of the arm plate 118 such the second spring seat 132 of the arm plate 118) is rotationally disposed under the hook portion 122 of the arm 112.

In one enablement of the first expression of the embodiment of FIGS. 4-9, the second end portion 130 is a substantially-radially-outwardly-extending second end portion. In one variation, the spring case 114 includes a radially outer annular wall 134 having a wall portion 136 including a radially inward protrusion 138 which defines the first spring seat 124. In one modification, the arm plate 118 includes an arm-plate portion 140 first extending radially outward, then extending in a circumferential or tangential direction, and then extending longitudinally, wherein the arm-plate portion 140 defines the second spring seat 132. In one example, the wall portion 136 includes an opposing radially inward recess 142 having circumferentially spaced apart recess ends 144, and the spring case 114 has a tab 146 disposed in the radially inward recess 142 to limit spring rotation about the longitudinal axis 126. It is noted that, in this example, limited spring rotation is achieved with a protrusion from the main body of the tensioner which enables the tensioner to fit in a tighter FEAD (front end accessory drive) package.

Figure 7:
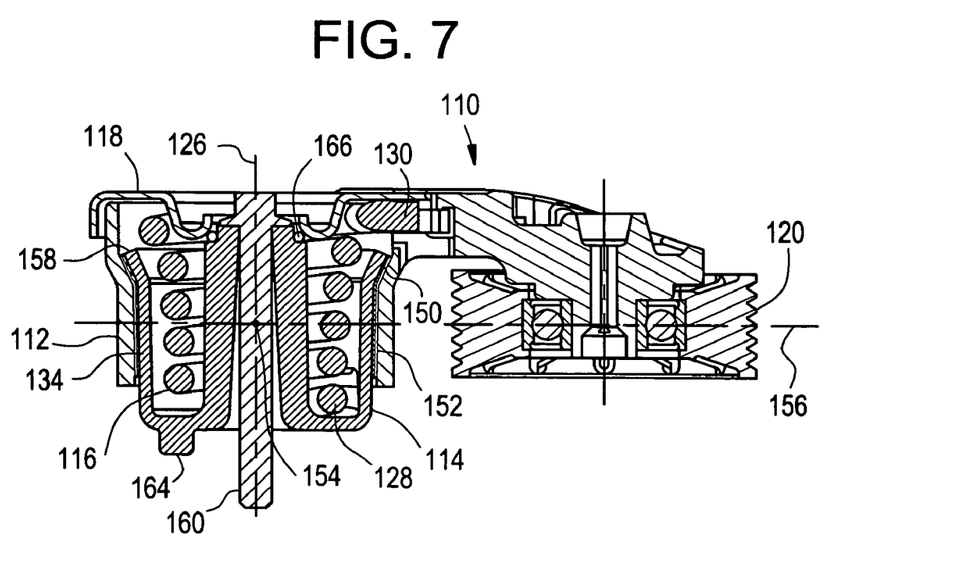
FIG. 7 is a cross-sectional view of the assembled belt tensioner of FIG. 6 taken along lines 7-7 of FIG. 6.
Figure 8:
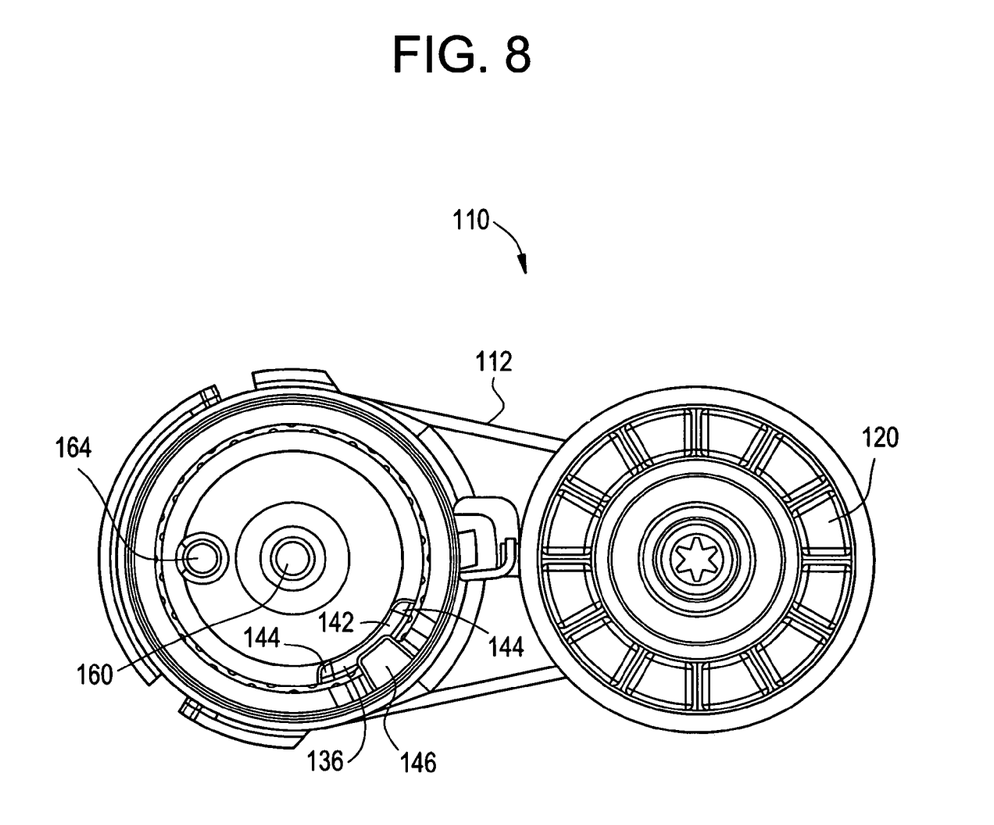
FIG. 8 is a bottom planar view of the assembled belt tensioner of FIG. 4.
Figure 9:
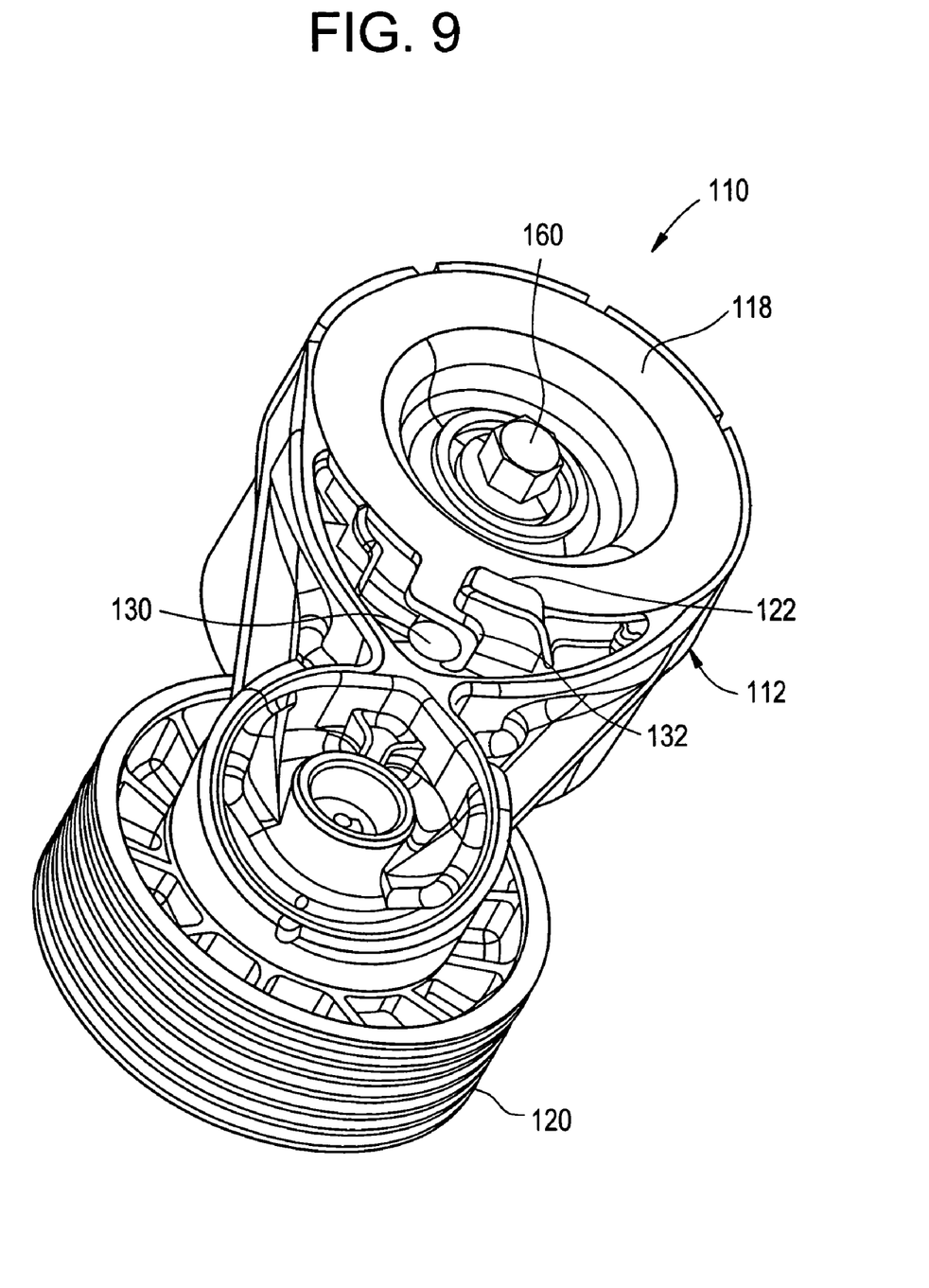
FIG. 9 is a perspective view of the assembled belt tensioner of FIG. 4.

In one configuration of the first expression of the embodiment of FIGS. 4-9, the tapered arm 112 and spring case 114 joint profile seen in FIG. 7 prevents the longitudinally compressed spring 116 from disassembling the belt tensioner 110 in a longitudinally downward direction, while the second spring seat 132 of the arm plate 118 being disposed underneath the hook portion 122 of the arm 112 prevents the longitudinally compressed spring 116 from disassembling the belt tensioner 110 in a longitudinally upward direction.

In one arrangement of the first expression of the embodiment of FIGS. 4-9, the belt tensioner 110 also includes a pivot bushing 148 disposed between, and in contact with, the arm 112 and the spring case 114 and circumferentially surrounding the spring 116. In one variation the pivot bushing 148 includes a substantially outward or inward flared cone portion 150 and a substantially constant diameter cylinder portion 152. In one modification, the cone portion 150 and the cylinder portion 152 are disposed radially between, and in contact with, the arm 112 and the spring case 114. In one example, the belt tensioner 110 also includes an idler pulley 120 supported by the arm 112, wherein the pivot bushing 148 has a centroid 154, wherein the idler pulley 120 has a plane of belt loading 156, and wherein the centroid 154 is disposed proximate the plane of belt loading 156. In one design, the centroid 154 lies substantially in the plane of belt loading 156. In one construction, the spring case 114 has a case rim 158, and the cone portion 150 is disposed proximate the case rim 158. In one utilization, the pivot bushing 148 is disposed radially outermost with significant axial length with the radially outer wall 134 of the spring case 114 acting as the pivot-bushing surface interface. This maximizes the surface and wear area of the combination alignment/offset/damping control pivot bushing 148. The pivot bushing 148 is very well contained and sealed.

As the pivot bushing 148 wears, the spring force sustains near constant load aiding in offset and parallelism control and sustained damping over time, as can be appreciated by those skilled in the art.

Figure 4:
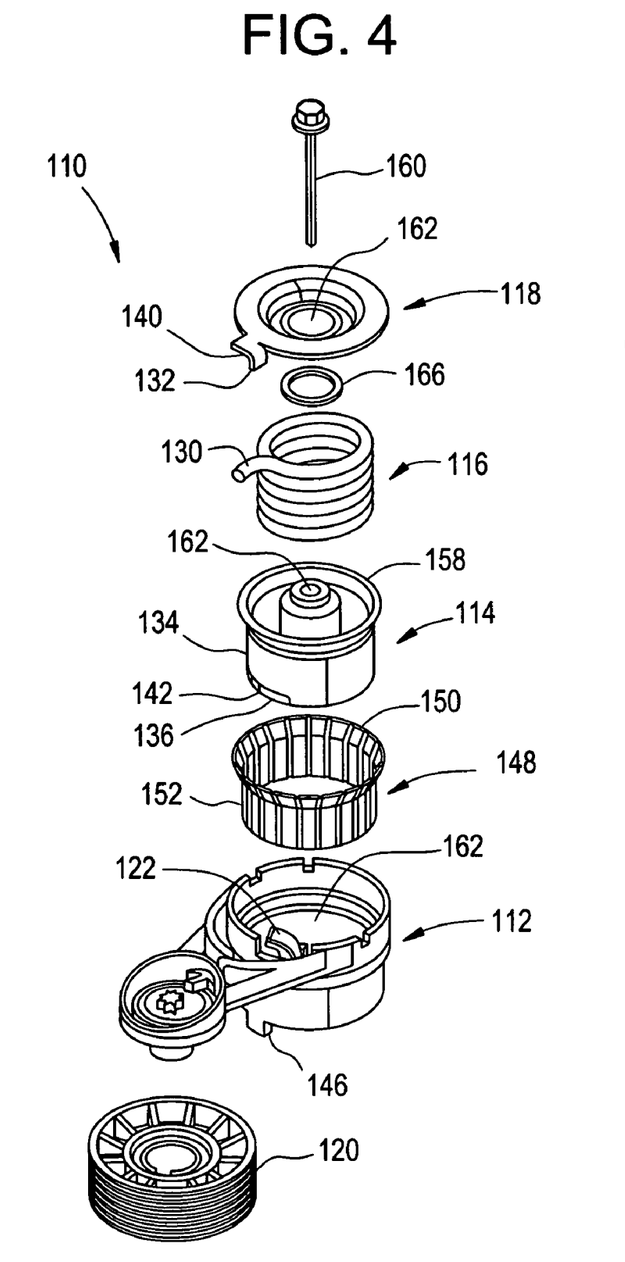
FIG. 4 is an exploded view of a second embodiment of the belt tensioner of the invention including an idler pulley.
Figure 5:
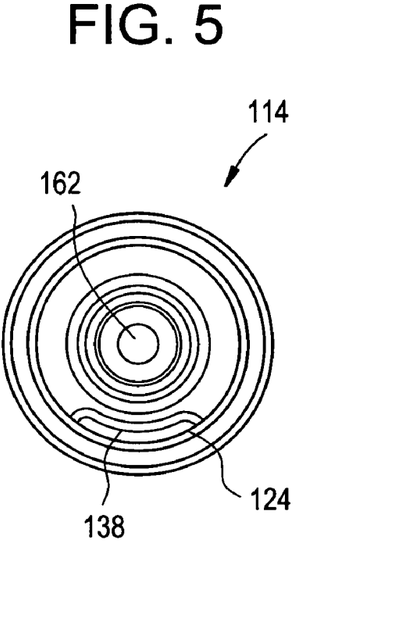
FIG. 5 is a top planar view of the spring case of the belt tensioner of FIG. 4.
Figure 6:
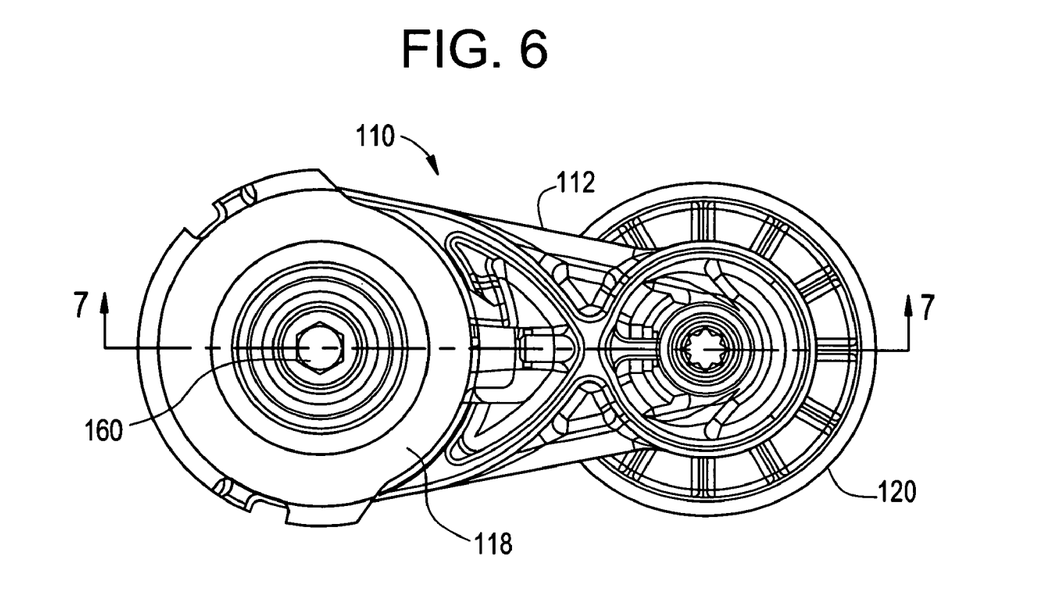
FIG. 6 is a top planar view of the assembled belt tensioner of FIG. 4.

In one employment of the first expression of the embodiment of FIGS. 4-9, the spring 116 includes a conical coil spring (providing necessary torque in a specialized package size), and a first distance from the longitudinal axis 126 to the spring 116 proximate the second end portion 130 is greater than a second distance from the longitudinal axis 126 to the spring 116 proximate the first end portion 128. In the same or a different employment, the belt tensioner 110 also includes a mounting bolt 160 for mounting the belt tensioner 110, wherein the arm plate 118 and the spring case 114 each have a central hole 162, and wherein when the belt tensioner 110 is mounted, the mounting bolt 162 passes through each central hole 162 and contacts only the spring case 114. In one variation, the spring case 114 longitudinally extends beyond the arm 112, and the spring case 114 has a longitudinally projecting alignment mounting pin 164 radially spaced apart from the central hole 162 of the spring case 114. In one construction, the spring 116 is a roundwire spring. In a different employment, not shown, the spring is a helical spring wherein the distance from the longitudinal axis to the spring is substantially constant along the longitudinal length of the spring. An optional O-ring seal 166 is shown in FIGS. 4 and 7. In one implementation, the conical spring and tapered tensioner body act to naturally drain away contaminants.

A method for assembling the belt tensioner 110 described in the fifth previous paragraph includes steps a) through e). Step a) includes disposing the spring case 114 in the arm 112. Step b) includes disposing the spring 116 in the spring case 114. Step c) includes using the arm plate 118 to longitudinally compress the spring 116 and rotating the arm plate 118 until the spring 116 is in torsion with the first end portion 128 engaging the first spring seat 124, with the second end portion 130 engaging the second spring seat 132, and with the arm plate 118 (meaning at least a portion of the arm plate 118 such the second spring seat 132 of the arm plate 118) longitudinally passing inward of the hook portion 122. Step d) includes rotating the arm plate 118 to release some of the torsion in the spring 116 for the second end portion 130 to rotationally urge the arm plate 118 (meaning at least a portion of the arm plate 118) under the hook portion 122. Step e) includes using the arm plate 118 to release some of the longitudinal compression in the spring 116 until the arm plate 118 (meaning at least a portion of the arm plate 118) becomes trapped underneath the hook portion 122.

In one application of the first expression of the embodiment of FIGS. 4-9, when the belt tensioner 110 is assembled, the spring 116 is in torsional compression (wind up) and is in longitudinal compression. In a different application of the first expression of the embodiment of FIGS. 4-9 (with the spring 116 wound in the opposite direction from that shown in FIG. 4), when the belt tensioner 110 is assembled, the spring is in torsional expansion (unwinding) and is in longitudinal compression.

In one extension, the method of the second previous paragraph is also for disassembling the assembled belt tensioner 110 and further includes steps f) through j). Step f) includes using the arm plate 118 to increase the longitudinal compression in the spring 116. Step g) includes rotating the arm plate 118 to increase the torsion in the spring 116 until the arm plate 118 rotationally clears the hook portion 122. Step h) includes using the arm plate 118 to release all of the longitudinal compression and torsion in the spring 116. Step i) includes removing the spring 116 from the spring case 114. Step j) includes removing the spring case 114 from the arm 112.

In another extension, the method of the third previous paragraph is also for mounting the assembled belt tensioner 110, wherein the arm plate 118 and the spring case 114 each have a central hole 162, and further includes steps f) through i). Step f) includes obtaining a threaded mounting bolt 160. Step g) includes disposing the spring case 114 of the assembled belt tensioner 110 against an engine (not shown) having a threaded mounting hole (not shown) with the central hole 162 of the spring case 114 substantially coaxially aligned with the mounting hole of the engine. Step h) includes passing the mounting bolt 160 through the central holes 162 of the arm plate 118 and the spring case 114. Step i) includes threadably engaging the mounting bolt 160 with the mounting hole.

A second expression of the embodiment of FIGS. 4-9 is for a belt tensioner 110 which includes a belt-tensioner arm 112, a belt-tensioner spring case 114, a belt-tensioner coil spring 116, an arm plate 118, and a pivot bushing 148. The arm 112 is adapted to support an idler pulley 120. The spring case 114 is disposed in the arm 112. The spring 116 is disposed in the spring case 114. The spring 116 is longitudinally compressed between the arm plate 118 and the spring case 114. The pivot bushing 148 circumferentially surrounds the spring 116, has a substantially outward or inward flared cone portion 150, and has a substantially constant diameter cylinder portion 152.

The enablements, arrangements, employment, etc. of the first expression of the embodiment of FIGS. 4-9 are equally applicable to the second expression of the embodiment of FIGS. 4-9.

Figure 10:
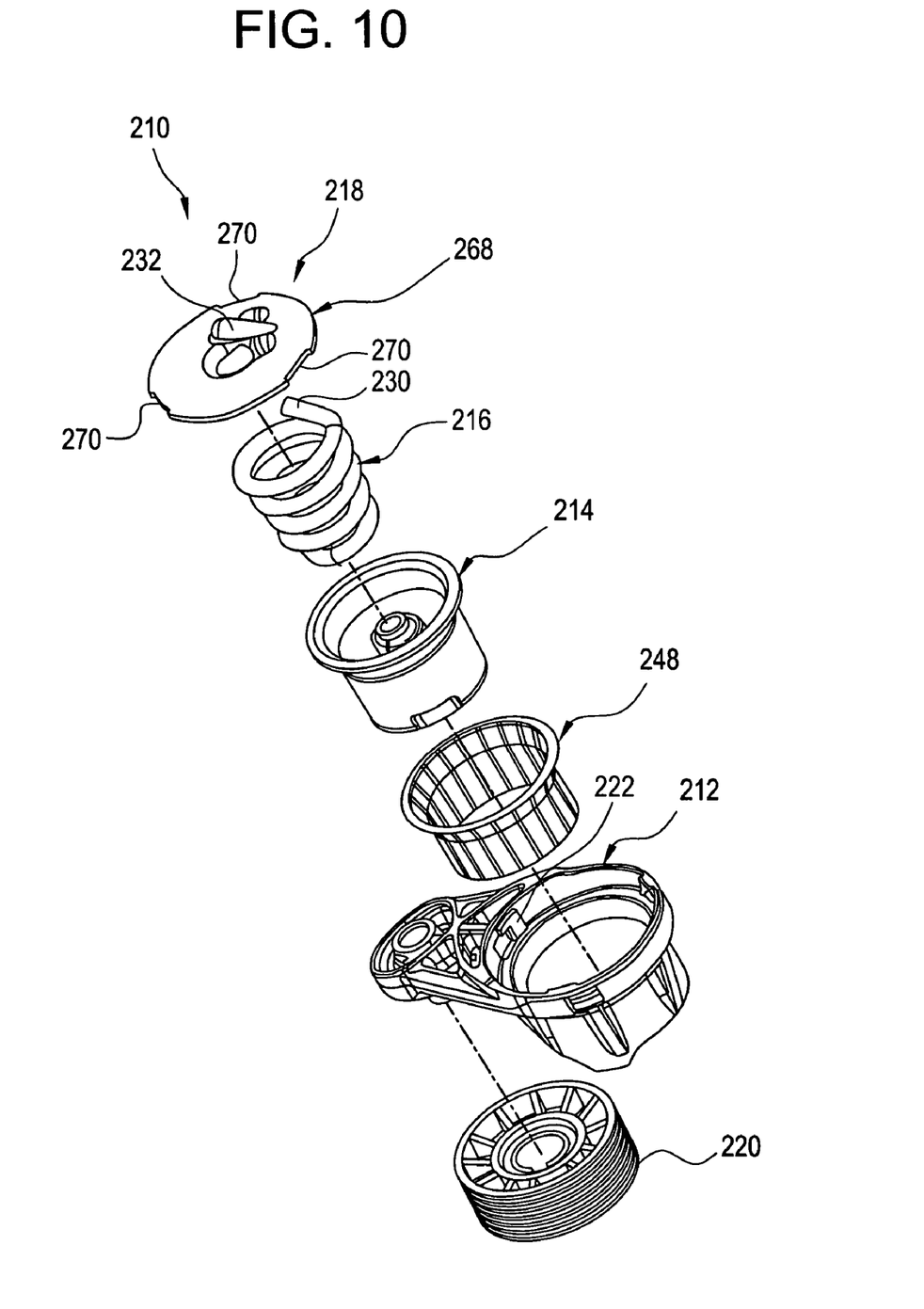
FIG. 10 is an exploded view of an alternate second embodiment of the belt tensioner of the invention including an idler pulley.

Referring once more to the drawings, FIG. 10 illustrates an alternate second embodiment of the present invention. A first expression of the embodiment shown in FIG. 10 is identical to the first expression of the embodiment shown in FIGS. 4-9 and described in the eleventh previous paragraph, and a method for assembling the belt tensioner 210 shown in FIG. 10 is identical to the method for assembling the belt tensioner 110 shown in FIGS. 4-9 and described in the sixth previous paragraph. In a first expression of the embodiment shown in FIG. 10, the arm plate 218 (meaning at least a portion of the arm plate 218 such a portion of the outer periphery 268 of the arm plate 218) is rotationally disposed under the hook portion 222 of the arm 212.

In one enablement of the embodiment of FIG. 10, the arm plate 218 has an outer periphery 268 including a peripheral notch 270 (three notches are shown in FIG. 10). In the same or a different enablement, the hook portion 222 (with one hook portion 222 per notch 270) has a first circumferential extent, the peripheral notch 270 has a second circumferential extent, and the second circumferential extent is greater than the first circumferential extent. In the same or a different enablement, the second spring seat 232 of the arm plate 218 is disposed radially inward of the outer periphery 268 of the arm plate 218.

The enablements, arrangements, employment, etc. of the first expression of the embodiment of FIGS. 4-9 are equally applicable to the first expression of the embodiment of FIG. 10 taking into account the differences in the arm plates 218 and 118, the second end portions 230 and 130 of the springs 216 and 116, and the hook portions 222 and 122 of the arm 212 and 112. In the embodiment of FIG. 10, a spring case 214, a pivot bushing 248, and an idler pulley 220 are also shown.

Several benefits and advantages are derived from one or more of the expressions of an embodiment and method of FIGS. 4-9. In one example, having a longitudinally and torsionally compressed spring, a hook portion of the arm, a first spring seat of the spring case, and a second spring seat of an arm plate allows assembly and disassembly of a belt tensioner without the use of assembly fasteners. In the same or a different example, having a pivot bushing with a substantially outward or inward flared cone portion and a substantially constant diameter cylinder portion delivers improved offset and damping control (via the cone portion) and alignment guidance (via the cylinder portion), as can be appreciated by those skilled in the art.

The foregoing description of several expressions of embodiments and methods of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. A belt tensioner comprising:
 a) a belt-tensioner arm adapted to support an idler pulley and having a hook portion;
 b) a belt-tensioner spring case disposed in the arm and having a first spring seat;
 c) a belt-tensioner coil spring disposed in the spring case and having a longitudinal axis and longitudinally spaced apart first and second end portions; and
 d) an arm plate rotatable about the longitudinal axis and having a second spring seat, wherein the spring is longitudinally compressed between the arm plate and the spring case, wherein the spring is in torsion, wherein the first end portion is rotationally seated against the first spring seat of the spring case, wherein the second end portion is rotationally seated against the second spring seat of the arm plate, and wherein a portion of the arm plate is rotationally disposed under the hook portion of the arm, thus securing the belt tensioner at least by compressive longitudinal spring force.

2. The belt tensioner of claim 1, wherein the second spring seat of the arm plate is rotationally disposed under the hook portion of the arm, and wherein the second end portion is a substantially-radially-outwardly-extending second end portion.

3. The belt tensioner of claim 2, wherein the arm plate includes an arm-plate portion first extending radially outward, then extending in a circumferential or tangential direction, and then extending longitudinally, wherein the arm-plate portion defines the second spring seat.

4. The belt tensioner of claim 1, wherein the spring case includes a radially outer annular wall having a wall portion including a radially inward protrusion which defines the first spring seat.

5. The belt tensioner of claim 4, wherein the wall portion includes an opposing radially inward recess having circumferentially spaced apart recess ends, and wherein the spring case has a tab disposed in the radially inward recess to limit spring rotation about the longitudinal axis.

6. The belt tensioner of claim 1, also including a pivot bushing disposed between, and in contact with, the arm and the spring case and circumferentially surrounding the spring.

7. The belt tensioner of claim 6, wherein the pivot bushing includes a substantially outward or inward flared cone portion and a substantially constant diameter cylinder portion.

8. The belt tensioner of claim 7, wherein the cone portion and the cylinder portion are disposed radially between, and in contact with, the arm and the spring case.

9. The belt tensioner of claim 8, also including an idler pulley supported by the arm, wherein the pivot bushing has a centroid, wherein the idler pulley has a plane of belt loading, and wherein the centroid is disposed proximate the plane of belt loading.

10. The belt tensioner of claim 9, wherein the centroid lies substantially in the plane of belt loading.

11. The belt tensioner of claim 10, wherein the spring case has a case rim, and wherein the cone portion is disposed proximate the case rim.

12. The belt tensioner of claim 1, wherein the spring includes a conical coil spring, and wherein a first distance from the longitudinal axis to the spring proximate the second end portion is greater than a second distance from the longitudinal axis to the spring proximate the first end portion.

13. The belt tensioner of claim 1, also including a mounting bolt for mounting the belt tensioner, wherein the arm plate and the spring case each have a central hole, and wherein when the belt tensioner is mounted, the mounting bolt passes through each central hole and contacts only the spring case.

14. The belt tensioner of claim 1, wherein the arm plate has an outer periphery including a peripheral notch, and wherein at least a portion of the outer periphery of the arm plate is rotationally disposed under the hook portion of the arm.

15. The belt tensioner of claim 14, wherein the hook portion has a first circumferential extent, wherein the peripheral notch has a second circumferential extent, and wherein the second circumferential extent is greater than the first circumferential extent.

16. The belt tensioner of claim 14, wherein the second spring seat of the arm plate is disposed radially inward of the outer periphery of the arm plate.

17. A belt tensioner comprising:
 a) a belt-tensioner arm adapted to support an idler pulley;
 b) a belt-tensioner spring case disposed in the arm;
 c) a belt-tensioner coil spring disposed in the spring case;
 d) an arm plate, wherein the spring is longitudinally compressed between the arm plate and the spring case; and
 e) a pivot bushing circumferentially surrounding the spring, having a substantially outward or inward flared cone portion, and having a substantially constant diameter cylinder portion.

18. The belt tensioner of claim 17, wherein the cone portion and the cylinder portion are disposed radially between, and in contact with, the arm and the spring case.

19. The belt tensioner of claim 18, also including an idler pulley supported by the arm, wherein the pivot bushing has a centroid, wherein the idler pulley has a plane of belt loading, and wherein the centroid is disposed proximate the plane of belt loading.

20. The belt tensioner of claim 19, wherein the centroid lies substantially in the plane of belt loading.

* * * * *